(12) United States Patent
Revell et al.

(10) Patent No.: US 8,337,924 B2
(45) Date of Patent: Dec. 25, 2012

(54) FORMULATION OF MILK-BASED BEVERAGES FOR CARBONATION

(75) Inventors: Richard A. Revell, Te Aroha (NZ); Lynley Drummond, Katikati (NZ)

(73) Assignee: Splintiz Investments, Ltd, Te Aroha (NZ)

( * ) Notice: Subject to any disclaimer, the term of this patent is extended or adjusted under 35 U.S.C. 154(b) by 603 days.

(21) Appl. No.: 12/064,022

(22) PCT Filed: Aug. 21, 2006

(86) PCT No.: PCT/NZ2006/000211
§ 371 (c)(1),
(2), (4) Date: Oct. 8, 2008

(87) PCT Pub. No.: WO2007/021205
PCT Pub. Date: Feb. 22, 2007

(65) Prior Publication Data
US 2010/0316778 A1    Dec. 16, 2010

(30) Foreign Application Priority Data
Aug. 19, 2005    (NZ) .................................... 541934

(51) Int. Cl.
*A23C 9/152*    (2006.01)
(52) U.S. Cl. .................. 426/329; 426/580; 426/601

(58) Field of Classification Search .................. 426/329, 426/601, 580
See application file for complete search history.

(56) References Cited

U.S. PATENT DOCUMENTS

| | | | |
|---|---|---|---|
| 3,951,832 A | 4/1976 | McCoy | |
| 3,984,347 A | 10/1976 | Keil | |
| 5,223,294 A | 6/1993 | Takenawa | |
| 5,510,409 A * | 4/1996 | Romano | ............... 524/322 |
| 5,589,099 A * | 12/1996 | Baum | ................ 510/514 |

FOREIGN PATENT DOCUMENTS

| | | |
|---|---|---|
| EP | 0878134 | 11/1998 |
| GB | 2254771 | 10/1992 |
| JP | 60083559 A | 5/1985 |
| NZ | 226287 | 4/1992 |
| WO | 9714490 A1 | 4/1997 |
| WO | WO 2005039732 A1 * | 5/2005 |

OTHER PUBLICATIONS

Bevaloid 5900 Defoamer MSDS. 2001.*

* cited by examiner

*Primary Examiner* — Nikki H Dees
(74) *Attorney, Agent, or Firm* — Lowe Graham Jones PLLC

(57) ABSTRACT

A composition for addition to a milk or milk-based beverage, in which a preferred embodiment of the composition includes on a w/w basis (to a total of 100) Silica between about 1% to about 10%, vegetable oil between about 20%-about 90%; and Polyglycol mix between about 10%-about 90%. The composition is provided in an amount to control foaming and frothing in the beverage as a result of carbonation.

14 Claims, No Drawings

FORMULATION OF MILK-BASED BEVERAGES FOR CARBONATION

PRIORITY CLAIM

This application claims the benefit of prior PCT Application Ser. No. PCT/NZ2006/000211 entitled "FORMULATION OF MILK-BASED BEVERAGES FOR CARBONATION," filed on Aug. 21, 2006, which claims priority to NZ 541934 filed Aug. 19, 2005.

FIELD OF THE INVENTION

The invention relates to a base composition for the preparation of a milk or milk-based carbonated beverage, a method for preparing a milk or milk-based beverage using that base composition, and a product produced by that method.

However, it should be appreciated this invention may have applications outside this field.

BACKGROUND OF THE INVENTION

Carbonated soft drinks are well known in the prior art. Carbonated soft drinks account for almost half of the global soft drink market. The growth in their popularity has been accompanied by a significant decline in the consumption of milk and milk-based beverages. Concern at the general dietary intake patterns of many western societies has identified that the high intake levels of carbonated soft drinks may be one of the contributory factors in the overall decline in health status and diseases directly related to dietary intake.

Milk is generally accepted as a highly nutritious substance. In the diet, it is an excellent source of high quality protein, riboflavin (vitamin $B_2$), vitamin $B_{12}$, calcium and phosphorous, and a good source of vitamin A, thiamine (vitamin $B_1$), niacin and magnesium. Although nutritionally beneficial, milk and milk-based beverages are often considered unappealing. Carbonation provides an opportunity to deliver milk and its nutritional benefits in a more appealing manner, and offer a viable alternative to traditional soft drinks.

Prior art exists for the manufacture of milk, and milk-based beverages that vary in composition from the milk-base only (which may include but is not limited to fat-free, low fat and full fat types) through to standard flavoured milks (which typically include sweetening agents, flavours, stabilising agents, chelating agents, food acids etc), compositionally modified (e.g. protein enhanced, or lactose reduced) products, fortified milk-based beverages (includes the addition of one or more vitamin or mineral compounds) and more recently functional milk-based beverages (i.e. products to which ingredients have been added to deliver a specific health benefit). Formulated milk and milk-based beverages are available in, but not limited to, fresh, pasteurised and extended shelf-life (ESL) formats which require refrigerated storage and have a limited shelf-life of typically less than 1 to 6 weeks, and as UHT beverages with ambient temperature shelf-life of up to 18 months.

Milk and milk-based beverages may be manufactured using either fresh, pasteurised or otherwise thermally treated liquid milk as the base milk source, or they may be manufactured from powdered milk using well established recombining techniques.

The use of ultra-heat treatment (UHT) for the manufacture of ambient stable, long-life milks and milk-based flavoured beverages is well known in the prior art. A typical UHT process for milk-based beverages involves preheating the beverage mix to approximately 80° C., followed by rapid heating in a pressurised (approximately 400 kPa) system to prevent boiling, to approximately 140-150° C. (UHT temperature) for a few seconds. This is followed by rapid cooling.

A number of process and equipment configurations to achieve the UHT temperature requirements for milk-based beverages are also well established in the prior art. Such processes may include but are not limited to:

i. Direct systems in which the heating medium, typically steam, comes into direct contact with the product. Direct systems include steam injection where steam is injected directly into the product, and; steam infusion, where the product is introduced into a steam-filled unit. Added water from the steam is removed in flash cooling systems.

ii. Indirect systems here the heat to achieve UHT sterilisation is transferred from the heating media through a wall or partition of a heat exchanger unit.

Homogenisation of milk-based UHT beverages may occur either before (non-aseptically) the UHT process in indirect systems or post the UHT process (aseptically) in direct systems. Typically post UHT aseptic 2-stage homogenisation, at approximately 40-50° C., is preferred for milk-based beverages as this process contributes to improvements in the texture (reduction of potential graininess) and physical stability of the beverage products. Further rapid cooling to 20° C. or less then occurs prior to the transfer of the liquid to an aseptic tank, where it is held prior to packing.

Although carbonation is a naturally occurring phenomenon in some fermented beverages and natural mineral water, for the purposes of this invention, carbonation is the considered the deliberate introduction of $CO_2$ gas under pressure to the beverage, or water with which the beverage is prepared.

The solubility of $CO_2$ in water is a function of temperature and pressure. At a standard pressure of 1 atmosphere (Atm.) and a temperature of 15.6° C., water will dissolve a quantity of $CO_2$ equal to its own volume (i.e. 1.86 g of dissolved $CO_2$). This serves as the basis to describe levels of carbonation in carbonated beverages, based on gas volumes. Typically in carbonated soft drinks, different gas volumes are characteristic of different flavours. The more acidic flavours such as colas, lemonades, tonic and soda waters typically have gas volumes between 3.0 and 4.0. The sweeter fruit flavours and those of cream sodas have lower carbonation levels typically in the range of 2.5 to 2.8 gas volume and sparkling mineral waters often less and 2.0 gas volumes (Shachman, M. (2005) In: The Soft Drinks Companion—A Technical Handbook for the Beverage Industry, CRC Press, Boca Raton, Florida, U.S.A.; pp. 167 -177).

Carbonated milk and milk-based beverages are currently being sold on the USA market but may not be known to any great extent elsewhere. Whilst the concept is new to many consumers, patents in this field have existed since 1898. One of the most recent patents was taken out by a U.S.A. company known as Mac Farms that has now developed a wide range of functional carbonated milk drinks targeted toward certain market segments. Another recent patent addresses the combination of UHT treatment and carbonisation of milk products to manufacture shelf-stable carbonated milk products.

SUMMARY OF THE EMBODIMENTS OF INVENTION

The invention provides a composition for addition to a milk or milk-based beverage, the composition including the following components, on a w/w basis (wherein the component amounts total 100%):

1. Silica between about 1% and about 10%;
2. Vegetable oil between about 20%-about 90%; and
3. Polyglycol mix between about 10%-about 90%.

The invention in another aspect provides a process for the preparation of a carbonated milk or milk-based beverage, the process including the step of adding a composition including the following components, on a w/w basis (wherein the component amounts total 100%):

1. Silica between about 1% and about 10%;
2. Vegetable oil between about 20%-about 90%; and
3. Polyglycol mix between about 10%-about 90%;

in an amount effective to mitigate foaming and/or frothing in the beverage as a result of carbonation.

Preferably the polyglycol mix is a polyethylene/polypropylene glycol copolymer mix.

Preferably the polyglycol mix includes polyethylene glycol, polypropylene glycol and/or a polyglycerol ester of fatty acid.

Preferably the composition further includes propylene glycol.

Preferably the propylene glycol is present in an amount of between 0-about 10%.

Preferably the MW of the polypropylene glycol is about 2000.

Preferably the MW of the polyethylene glycol is about 600.

Preferably the polyglycol mix is liquid at room temperature.

Preferably the vegetable oil is a triglyceride.

Preferably the vegetable oil is any one or more of canola, safflower, sunflower, or almond oil.

Preferably the composition is added to the beverage to be carbonated in an amount of between about 10 ppm and about 50 ppm.

Preferably the composition added to the beverage is Rhodoline® DF 5900.

Preferably the milk is a milk substitute or milk derivative.

Preferably the milk is animal milk or a derivative thereof (e.g. whey).

Preferably the milk substitute is from legumes (e.g. soy); nuts (e.g. almonds) or grains (e.g. rice).

Preferably the milk or milk substitute is in a fresh, UHT, ESL, or powdered form.

Preferably, the formulated beverage is thermally processed using UHT processes to achieve a shelf stable product.

Preferably the formulated beverage (e.g. UHT) of the invention is carbonated to achieve a dissolved gas volume of between about 2.5 and about 4.0 gas volumes of $CO_2$.

Preferably the formulated beverage (e.g. UHT) of the invention is cooled, ideally, but not limited to, less than 4° C., but greater than 0° C., prior to carbonation.

Preferably the carbonated beverage further includes any one or more of vitamins, minerals, nutraceuticals, and essential fatty acids.

In another aspect, the invention provides a stable carbonated milk or milk-based beverage, the beverage including a composition including, on a w/w basis (wherein the component amounts total 100%):

1. Silica between about 1% to about 10%;
2. Vegetable oil between about 20%-about 90%; and
3. Polyglycol mix between about 10%-about 90%;

in an amount effective to mitigate foaming and/or frothing.

In another aspect, the invention provides a milk or milk-based beverage, the beverage including a composition including, on a w/w basis (wherein the component amounts total 100%):

1. Silica between about 1% to about 10%;
2. Vegetable oil between about 20%-about 90%; and
3. Polyglycol mix between about 10%-about 90%;

in an amount effective to mitigate foaming and/or frothing as a result of carbonation.

In another aspect, the invention provides a method of controlling, in a milk or milk-based carbonated beverage, the retention of $CO_2$ once exposed to atmospheric pressure, the method including the step of varying the amount of a composition including, on a w/w basis (wherein the component amounts total 100%):

1. Silica between about 1% to about 10%;
2. Vegetable oil between about 20%-about 90%; and
3. Polyglycol mix between about 10%-about 90%;

that is added to the beverage to mitigate foaming and/or frothing.

Preferably the rate of $CO_2$ release, bubble size and foam or froth volume can also be controlled.

In another aspect, the invention provides a milk or milk-based beverage including Rhodoline® DF 5900 in an amount effective to mitigate foaming and/or frothing as a result of carbonation. Preferably the amount of Rhodoline® DF 5900 is between about 10 ppm and 45 ppm.

DETAILED DESCRIPTION OF THE PREFERRED EMBODIMENTS OF THE INVENTION

In broad terms the invention is directed to the preparation of a carbonated milk or milk-based beverage, and a beverage product produced by that method. The invention is also directed to a base composition for addition to a milk or milk-based beverage that is capable of mitigating the effect of foaming and/or frothing in the beverage as a result of carbonation (an antifoam composition).

In particular, the invention relates to the manufacture of carbonated milk beverages made from any one or more of milk, milk substitute, any derivative of milk. The milk, milk substitute and/or derivative milk component may be in liquid form, or may be in powdered form which is reconstituted to a fluid by addition of a preferred liquid, such as water or any other fluid (including alcoholic beverages). The milk is preferably animal milk or a derivative thereof (e.g. whey). Milk substitutes can be selected from legumes (e.g. soy), nuts (e.g. almonds) and grains (e.g. rice).

It is envisaged the carbonated milk beverages will be available in a variety of forms for a variety of uses. The carbonated milk beverages may be flavoured, may be alcoholic or non-alcoholic and/or be further enhanced by having beneficial nutritional and health properties by the inclusion of vitamins, minerals, nutraceuticals, essential fatty acids and other supplements and so forth. The additives may similarly be added in powdered form or in fluid form to the base preparation.

The milk beverage can be in a fresh, UHT, ESL, or powdered form. It is preferred that the beverage uses fresh milk, or is thermally processed using UHT processes to achieve a shelf stable product.

Foaming is a problem with carbonated milk beverages. The reason behind this is due to the levels of $CO_2$ dissolved in the milk necessary to obtain sufficient carbonation. $CO_2$ is very soluble in milk or water at 0° C., the temperature where carbonation typically occurs. Carbonation occurs under pressure (preferably pre-cooled to between 0 and about 4° C. although higher temperatures (e.g. up to about 10° C.) are also options) and filling is typically achieved using well established counter pressure fill techniques. Carbonation preferably achieves a dissolved gas volume of between about 2.5 and about 4.0 gas volumes of $CO_2$. This should not be seen as limiting however. The bottle is then capped and left to equilibrate to about 4° C., or ambient where the $CO_2$ becomes less soluble and equilibrates forming pressure within the headspace greater than that of the outside environment. Upon opening of the bottle, releasing the pressure to atmospheric pressure, the $CO_2$ equilibrium of the milk changes and the milk becomes supersaturated with $CO_2$. This is thermodynamically unstable. The $CO_2$ diffuses toward air pockets on the side of the bottle, which grow and eventually dislodge, while others grow in their place (Walstra, P. (1996). Dispersed Systems: Basic Considerations. In Food Chemistry 3rd ed. O.R. Fenemma (Ed). Marcel Dekker, New York. pp. 44-149.).

A possible reason for the extra foaming when bottles are agitated is that when bottles are shaken more nuclei for the $CO_2$ bubbles can form. From these a large amount of foaming can occur.

For UHT options, the carbonated, processed beverage of the invention is preferably packed aseptically, under pressure in a counter pressure type filling unit. Preferably the formulated UHT beverage is packed in aseptic plastic or glass bottles. Such matters are not intended to be limiting. Fresh milk can be carbonated in a post-mix process or can be carbonated under pressure in a counter pressure type filling unit.

Milk-based liquids and water differ significantly in the degree of surface active components present, namely the milk proteins. These surfactants support the formation of foam bubbles and help to maintain their structure. For this reason foaming and frothing in carbonated milk and milk-based beverages is a more significant problem than with carbonated water. This problem is potentially further exacerbated in formulated milk and milk-based beverages, as in addition to the naturally occurring proteins, stabilising, emulsifying and thickening agents may further enhance the formation of highly stable foams.

That the milk proteins are one of the key components responsible for the formation of excessive foam and froth, which is typically stable, is apparent in the carbonation of both fresh and recombined milk without added ingredients. The surface active properties of milk proteins are well known, as is their ability to form strong films.

The inventors have found a combination of agents which are highly effective in controlling the foaming of the product while retaining an effective effervescence in carbonated milk-based beverages. Without wishing to be bound by any particular theory, it is hypothesised that the active mechanism of these components is to mitigate the formation of stable foams and froth by adsorption at the air/water interface.

Ideally a carbonated milk or milk-based beverage will have the ability to release the $CO_2$ at a similar rate to that of water, so that the effervescent effect of carbonation is maintained during consumption. Therefore it is preferable that any foam and froth control agents are carefully used and controlled to avoid excessively rapid release of the dissolved $CO_2$ when the beverage is released to atmospheric pressure (container is opened) prior to consumption.

When dissolved in water, $CO_2$ forms carbonic acid which, although a weak acid, does have a pH lowering effect. There are several advantages of the formation of the carbonic acid, it contributes to the characteristic acid note of carbonated beverages, it has a contributory effect in retarding the growth of undesirable micro-organisms, and most importantly, it releases $CO_2$ to provide the effervescent effect during consumption. The pH lowering effect of dissolved $CO_2$ is potentially important in carbonated milks, because of the effect of pH on protein solubility. Proteins are least soluble at their isoelectric point (IEP). Casein is the major class of proteins in bovine milk, accounting for approximately 80% of the total protein content. The IEP of bovine casein is generally accepted to occur at pH4.6. To maintain an acceptable beverage it is critical to avoid a final pH approaching this level, in order to prevent protein insolubility and a resultant grainy mouthfeel. The isoionic pH of the various protein fractions of the milk proteins ranges from pH 4.8 to 5.9, with an overall net negative charge at normal milk pH of approximately pH 6.6-6.7 Management of the final pH of the beverage is achieved by the use of salts to provide additional buffering capacity, and control of gas volumes.

As a result, the proteinaceous environment of a carbonated milk-based product is entirely unlike other non-protein environments. Many anti-foam agents work moderately well in isolation (e.g. silica; propylene glycol) however, there appears to be an enhanced effect when the combination according to the present invention is used in a milk or milk-based (or proteinaceous food) environment. Such an enhanced (or synergistic) interaction is surprising in food applications, and particularly so when looking at carbonated milk beverages.

The inventors originally comprehended that through the use of a specifically targeted single silicates (polydimethylsiloxane, AF9020 (GE Silicones)) or other silica based agents, that the problem of excessive foam formation in the preparation, processing, carbonation and packing of milk and milk-based beverages could be mitigated. However, this effect is less effective and reliable over a range of carbonation systems (and also when repeated in the same system). The inventors have now found that the use of a vegetable oil and a combination polyglycols (a polyglycol mix), in combination with the silica, within defined ranges, provides a surprisingly useful and consistent effect against excessive foam production. This is surprising as one would ordinarily believe that single silicates and a variety of combinations would all have much the same effect. This has been found not to be the case.

The antifoam composition according to the invention includes silica, which should be present in an amount of between about 1% and about 10% of the composition. More preferably the silica content should be between about 1% and about 7%. The silica can be provided in any suitable form (such as an emulsion) that is readily available commercially.

Preferably the polyglycol mix is preferably a polyethylene glycol (PEG)/polypropylene glycol (PPG) copolymer mix. It is further preferred that the MW of the polypropylene glycol is about 2000 and the MW of the polyethylene glycol is ≦about 600 (i.e. ≦PEG 600). Further the polyglycol mix can include a polyglycerol ester of fatty acid (PGE) in a preferred amount of up to about 10%. Combinations of PEG, PPG and PGE are also possible. The polyglycol mix should be present in an amount of between about 10% to about 90% of the composition, more preferably between about 10% and about 70%, or between about 10% and about 55%.

The composition can also include propylene glycol (PG), preferably in an amount of between 0 and about 10% of the antifoam composition.

The antifoam composition according to present invention can therefore be seen to include a mixture of the following components, within the following ranges:
  1. Silica between about 1% to about 10%;
  2. Vegetable oil about 20%-about 90%;
  3. Polyglycol mix: about 10%-about 90%; and
  4. Propylene glycol 0-about 10%.

It is preferred that the vegetable oil is a triglyceride. Such oils include canola, almond, and sunflower oils, amongst others (e.g. safflower oil). Almond oil is a less viscous oil and was consistently observed to result in the formation of large (clearly detectable) gas bubbles on the container sides during carbonation. All oils performed adequately (no difference in overall mix performance) in the formulations. Vegetable oil between about 20% and about 90%, preferably between 20% and 80% can be used.

Such compositions have been found by the inventors to be surprisingly highly effective in controlling the foaming of a carbonated milk beverage, as occurs during manufacture and filling of such beverage.

Preferably, the stability of this composition may be enhanced by the use of emulsifying agents such as the Tweens (e.g. Tween 80: polyoxyethylene sorbitan monooleate, and Tween 20: polyoxyethylene sorbitan monolaurate) at a rate of between about 2% to about 10%. Food grade emulsification systems, and many emulsifying compounds are available. These additives do not actively enhance the ability of the mix to minimise foaming. There a number of available options that could be used.

(All % are given on a w/w basis of the antifoam composition to be added to the milk or milk-based beverage to be carbonated).

It is of particular note that the polyglycol mix is preferably liquid at room temperature. A low addition rate of higher MW components is acceptable if they are able to be suspended adequately in the mix that remains liquid at ambient temperatures. Variants that are of higher molecular weights (MW) are not only difficult to suspend into solution but, when used in a chilled carbonated milk beverage system, result in a detectable residue on the side of the beverage container (bottle) as it is poured. This is considered detrimental to appeal. In addition such agents are less effective—they rapidly solidify in the chilled beverage and efficacy is thus reduced.

Furthermore the addition of such mixes to the final beverage at a rate of between about 10 and about 50 ppm is adequate for inhibition of carbonated beverage foaming, thus enabling improved processing whilst allowing adequate retention of carbonation to produce a pleasant carbonated product.

It is also of note that higher addition rates within the acceptable range result in ability to release $CO_2$ more rapidly—i.e. bubble size and release in mouth—this results in a changed mouthfeel and consumer response (i.e. the consumer can hear the difference). The inventor has found that by varying the dosage rate (between about 10 ppm to about 50 ppm) of the additive formulation, the rate of $CO_2$ release and bubble size can be controlled. As the bottled product is opened, and the contents released to atmospheric pressure, the audio characteristics (sound) of the $CO_2$ bubbles being released and bursting can be manipulated. The sound of carbonated soft drinks in particular is a widely recognised indication of adequate, typical and expected carbonation, adding to the overall experience of consuming a carbonated beverage. The lower dosage rate the slower the bubbles and the small the bubbles. This ability to vary the bubble size is an additional aspect of the invention and allows the production of carbonated beverages (alcoholic and non-alcoholic) that have individual characteristics that reflect the nature of the product produced. Once in possession of the composition (and component make-up) of this invention, varying the dosage rate for any particular milk or milk-based product, to find the optimum dose rate for a particular carbonated product would be well within the ability of a skilled person.

For optimal effect the agent or overall combination of agents is preferably highly hydrophobic and/or non-ionic in nature. Furthermore, it has been found that the agent or combination of agents may be used at a low dosage rate so as to not negatively impact on the organoleptic properties of the final milk or milk-based carbonated beverage.

Carbonation can occur at any point in the production of a carbonated product. Carbonation systems, such as in line carbonation (for both bottled and post-mix applications), carbonation in bottle, carbonation in pressure vessel, carbonation via sintered bed can be used.

The composition of the invention can be added to a milk or milk-based product which is stored for carbonation at a later time, convenient to the user. For example this could be a range of supermarket-type milks or post-mix type options that could be carbonated at the point-of-sale. Alternatively, the composition could be sold separately with instructions for addition to milks (e.g. supermarket type milks) prior to carbonation. Thus effervescent flavoured milks (chocolate, strawberry etc.) could be created as desired.

Additionally the inventor has found that using conventional stabilising and emulsifying agents (e.g. carrageenan, xanthan gum etc) that tend to contribute viscosity to the final milk or milk-based products (UHT, fresh milk etc.), also has a strong effect on the stabilisation of foam. Such products should preferably be avoided or kept to a minimum if possible. Small amounts can be used if needed (see Examples) but this is not preferred.

EXAMPLE 1

In this example a formulation and method to produce an ambient stable UHT carbonated beverage using a single surface active agent. This example does not include the addition of fortifying agents, nutritional supplements, or other compounds to deliver a specific health benefit. Such additions may, however, be used if desired.

The ingredients and their relative quantities for the preparation of the liquid batch prior to UHT and carbonation processes are provided. The liquid milk may either be fresh or pasteurised whole or skim milk, or may be recombined from whole or skim powders (preferably instantised) to the equivalent solids concentration (typically 11.5% to 14.0% solids). Batch size is related to the facilities available. Addition rates and types of flavouring, sweetening and colour ingredients may be adjusted to market preference To the prepared liquid milk add:

| | |
|---|---|
| Sucrose (preferably fine grade) | 2.0% to 8.0% w/v |
| Sodium citrate | 0.2% to 0.6% w/v |
| Caramel flavour (liquid) | 0.15% to 0.25% v/v |
| Brown HT | 0.002% to 0.008% w/v |
| AF9020 | 4 ppm to 10 ppm silicone basis |

Mix with gentle to moderate agitation to ensure full dissolution and/or dispersion of all added ingredients.

Process and pack according to standard UHT and carbonation practices. Preferably carbonation level is between 2.5 and 4.0 gas volumes of $CO_2$.

On further review, it was found that milk or milk-based products including AF9020 did not perform adequately on a consistent basis. Just adding a silicate based agent (i.e. where silica is the only active ingredient e.g. AF9020) to the system was found to be less reliable and not as consistently effective as adding a combination of antifoam ingredients as provided by Rhodoline® DF 5900 used in Examples 2 and 3 below, or as provided in Examples 4 to 8 below.

EXAMPLE 2

In this example a preferred formulation and method to produce an ambient stable UHT carbonated beverage using a proprietary mix (Rhodoline® DF 5900) of surface active agents. This example does not include the addition of fortifying agents, nutritional supplements, or other compounds to deliver a specific health benefit. Again, such additions may be used if desired.

The formulation and actual component ingredients in the Rhodoline® DF 5900 are unknown. Rhodaline products are known for use in non-food applications however this product has been formulated with food grade components. Its use with proteinaceous products such as milk-based products is entirely unknown and its efficacy surprising given the poor results found when using AF9020 for example.

The ingredients and their relative quantities for the preparation of the liquid batch prior to UHT and carbonation processes are provided. The liquid milk may either be fresh or pasteurised skim milk, or may be recombined from skim powder (preferably instantised) to the equivalent solids concentration (typically 11.5% to 14.0% solids). Batch size is related to the facilities available. Addition rates and types of flavouring, sweetening and colour ingredients may be adjusted to market preference.

To the prepared liquid milk add:

| | |
|---|---|
| Sucrose (preferably fine grade) | 2.0% to 4.0% w/v |
| Fructose | 2.0% to 4.0% w/v |
| Hydroxymethylcellulose | 0.02% to 0.08% w/v |
| Sodium tripolyphosphate | 0.025% to 0.10% w/v |
| Tropical flavour (liquid) | 0.2% to 0.25% v/v |
| Ponceau 4R | 0.001% to 0.003% w/v |
| Exacol Yolkine R1873 | 0.0015 to 0.0025% w/v |
| Rhodoline ® DF 5900 | 10 ppm to 45 ppm |

Mix with gentle to moderate agitation to ensure full dissolution and/or dispersion of all added ingredients.

Process and pack according to standard UHT and carbonation practices. Preferably carbonation level is between 2.5 and 4.0 gas volumes of $CO_2$.

EXAMPLE 3

In this example a further preferred formulation and method to produce an ambient stable UHT carbonated beverage using a proprietary mix (Rhodoline® DF 5900) of surface active agents. This example does not include the addition of fortifying agents, nutritional supplements, or other compounds to deliver a specific health benefit. Such additions may be used.

The ingredients and their relative quantities for the preparation of the liquid batch prior to UHT and carbonation processes are provided. The liquid milk may either be fresh or pasteurised whole or skim milk, or may be recombined from whole or skim powders (preferably instantised) to the equivalent solids concentration (typically 11.5% to 14.0% solids). Batch size is related to the facilities available. Addition rates and types of flavouring, sweetening and colour ingredients may be adjusted to market preference To the prepared liquid milk add:

| | |
|---|---|
| Sucrose (preferably fine grade) | 2.0% to 8.0% w/v |
| Sodium citrate | 0.2% to 0.6% w/v |
| Vanilla flavour (liquid) | 0.10% to 0.35% v/v |
| Brown HT | 0.000% to 0.002% w/v |
| Rhodoline ® DF 5900 | 10 ppm to 45 ppm |

Mix with gentle to moderate agitation to ensure full dissolution and/or dispersion of all added ingredients.

Process and pack according to standard UHT and carbonation practices. Preferably carbonation level is between 2.5 and 4.0 gas volumes of CO2.

The products produced in Examples 2 and 3 had effective and consistent control of foam and froth production while retaining the desired effervescence.

FURTHER EXAMPLES

The following Examples were conducted to determine the metes and bounds of the invention as inferred from the success of using Rhodoline® DF 5900 (combination of agents including silica) as the antifoam agent.

During the course of development, the inventors found that the performance of added mixes (i.e. the antifoam compositions) to mitigate foaming could be accurately predicted for any processed milk system by evaluation of the mix in a fresh pasteurised milk that was then subjected to carbonation. This has enabled laboratory scale evaluations to be completed and on the basis of these experiments the inventors have been able to determine mix performance at various addition rates.

The formulated mixtures were measured by weighing, and added directly to chilled low fat (1.5%) milk. This milk was filled into bottles and carbonated according to previously established and standardised methods, using direct carbon dioxide injection under pressure into the chilled milk system. Following carbonation, and pressure release, 200 g of the carbonated milk was poured into a graduated cylinder using tared balance. The total volume of the milk (foam+liquid) was recorded, and then recorded again after 30 seconds. Volume of foam, rate of break down, foam characteristics, and general appearance were noted. The ability of the added mixes to prevent excessive foaming and frothing and to permit successful carbonation, were apparent, and to some extent could be predicted by the behaviour of the milk mix during bottle filling prior to carbonation.

Performance was judged on both the volume of foam formation on pouring and the rate of foam breakdown, with the prerequisite ability to hold carbonation a given.

Abbreviations

PEG: polyethylene glycol

PPG: polypropylene glycol

PGE: polyglycerol esters of fatty acids

PG: propylene glycol

Silica emulsion contains 20% silica

EXAMPLE 4

When added to the beverage at a rate of approximately 15-50 ppm:

| | | |
|---|---|---|
| Canola oil | 30% | |
| Copolymer mix: | | |
| PEG 400 | 20% | 50% |
| PEG 600 | 15% | |
| PPG 2000 | 15% | |
| Silica emulsion | 20% | |
| | 100% | |

EXAMPLE 5

When added to the beverage at a rate of approximately 20-50 ppm:

| Almond oil | 50% | |
| --- | --- | --- |
| Copolymer mix: | | |
| PEG 600 | 10% | 20% |
| PPG 2000 | 10% | |
| Tween 20 | 5% | |
| Silica emulsion | 25% | |
| | 100% | |

EXAMPLE 6

When added to the beverage at a rate of approximately 30-50 ppm:

| Sunflower oil | 50% | |
| --- | --- | --- |
| Copolymer mix: | | |
| PEG 200 | 10% | 28% |
| PG | 10% | |
| PPG 2000 | 8% | |
| Tween 80 | 2% | |
| Silica emulsion | 20% | |
| | 100% | |

EXAMPLE 7

When added to the beverage at a rate of approximately 30-50 ppm:

| Canola oil | 80% | |
| --- | --- | --- |
| Copolymer mix: | | |
| PEG 400 | 7% | 15% |
| PEG 600 | 3% | |
| PGE | 3% | |
| Tween 20 | 2% | |
| Silica emulsion | 5% | |
| | 100% | |

EXAMPLE 8

When added to the beverage at a rate of approximately 30-50 ppm:

| Almond oil | 50% | |
| --- | --- | --- |
| Copolymer mix: | | |
| PEG 200 | 10% | 20% |
| PEG 600 | 10% | |
| PG | 10% | |
| Silica emulsion | 20% | |
| | 100% | |

Examples of results from trials that demonstrate the effectiveness of the formulations provided in Table 1.

TABLE 1

| Example | Addition rate (ppm) | Volume at time = 0 (ml) | Volume at 30 sec (ml) | Comments |
| --- | --- | --- | --- | --- |
| 4 | 50 | 420 | 220 | Rapid dissipation of foam |
| 4 | 20 | 550 | 230 | Foamed extensively on pouring but rapid breakdown. |
| 5 | 40 | 550 | 240 | Very fine foam, rapid breakdown |
| 6 | 30 | 300 | 275 | Low foam on pouring |
| 7 | 40 | 300 | 260 | Large bubbles, foaming not excessive |
| 8 | 40 | 320 | 280 | Moderately fine foam |
| DF 5900 | 35 | 320 | 200 | Low foam, rapid dissipation |
| DF 5900 | 50 | 370 | 210 | Rapid breakdown of foam, large bubbles initially |

COMPARATIVE EXAMPLES

A number of model mixes did not perform adequately and could not be considered successful, such models include:

EXAMPLE 9

When added to the beverage at a rate of approximately 15-50 ppm:

| Canola oil | 80% |
| --- | --- |
| Copolymer mix: | |
| PEG 200 | 5% |
| PEG 400 | 5% |
| Silica emulsion | 10% |
| | 100% |

EXAMPLE 10

When added to the beverage at a rate of approximately 25-50 ppm:

| Canola oil | 50% |
| --- | --- |
| Copolymer mix: | |
| PEG 400 | 10% |
| PEG 600 | 10% |
| Tween 20 | 5% |
| Silica emulsion | 25% |
| | 100% |

EXAMPLE 11

When added to the beverage at a rate of approximately 25-50 ppm:

| | |
|---|---|
| Sunflower oil | 50% |
| Copolymer mix: | |
| PEG 200 | 10% |
| PEG 400 | 20% |
| PPG 2000 | 20% |
| | 100% |

In contrast, examples of results from trials that demonstrate the ineffectiveness (foam produced is stable) of formulations are provided are in Table 2.

TABLE 2

| Example | Addition rate (ppm) | Volume at time = 0 (ml) | Volume at 30 sec (ml) | Comments |
|---|---|---|---|---|
| 9 | 40 | 550 | 530 | Fine, creamy, stable foam |
| 10 | 30 | 560 | 540 | Large bubbles on carbonation. Stable fine foam |
| 11 | 40 | 510 | 490 | Very creamy foam. Stable |
| AF9020 | 40 | 550 | 550 | Very fine stable foam |

The inventors have therefore shown that there is a particular combination of components in particular ranges that should be used in an antifoam composition to achieve the enhanced, consistent, effect required to produce a carbonated milk or milk-based beverage with acceptable foaming characteristics. Such characteristics include a controllable foaming, or frothing, response as well as retaining a desired effervescence. As can be seen, the AF9020 failed to result in adequate foaming control, (indicative of lack of consistent performance) as did combinations not meeting the requirements of the invention.

Given the similarities of result between the formulations in Examples 4 to 8 and that observed for Rhodoline® DF 5900, the inventors believe that Rhodoline® DF 5900 also includes a combination of the components, or similar, as found by the inventors to be consistently effective.

While in the foregoing description there has been made reference to specific components or integers of the invention having known equivalents then such equivalents are herein incorporated as if individually set forth.

Although this invention has been described by way of example only and with reference to possible embodiments thereof it is to be understood that modification or improvements may be made without departing from the scope or spirit of the invention as defined in the attached claims.

The embodiments of the invention in which an exclusive property or privilege is claimed are defined as follows:

1. A process for the preparation of a carbonated milk or milk-based beverage, the process comprising:
adding between about 10 ppm and about 50 ppm of an anti-foam agent to the milk or milk-based beverage, the anti-foam agent including the following components, on a w/w basis:
silica between about 1% to about 10%;
vegetable oil between about 20% to about 80%; and
polyglycol mix between about 10% to about 70%;
wherein the polyglycol mix includes at least one polypropylene glycol having a molecular weight of 2000 and at least one polyethylene glycol having a molecular weight of 600 or less.

2. The process of claim 1, wherein the milk is a milk substitute or milk derivative.

3. The process of claim 1 wherein the milk is derived from animals.

4. The process of claim 1 wherein the milk is in a fresh, UHT, ESL, or powdered form.

5. The process of claim 1, wherein the polyglycol mix further comprises a polyglycerol ester of fatty acids.

6. The process of claim 1, wherein the anti-foam agent further includes a propylene glycol in an amount between 0 to about 10 percent.

7. The process of claim 1, wherein the silica is in an emulsion form.

8. The process of claim 1, wherein the polyglycol mix is liquid at room temperature.

9. The process of claim 1, wherein the vegetable oil is a triglyceride.

10. The process of claim 1, wherein the vegetable oil is any one or more of canola, sunflower, or almond oil.

11. A stable carbonated milk or milk-based beverage, the beverage comprising:
milk, milk substitute, or a derivative of milk; and
between about 10 ppm and about 50 ppm of an anti-foam agent, the anti-foam agent comprising the following components on a w/w basis:
silica between about 1% to about 10%;
vegetable oil between about 20% to about 80%; and
polyglycol mix between about 10% to about 70%;
wherein the polyglycol mix includes at least one polypropylene glycol having a molecular weight of 2000 and at least one polyethylene glycol having a molecular weight of 600 or less.

12. A milk or milk-based beverage, comprising:
milk, milk substitute, or a derivative of milk; and
between about 10 ppm and about 50 ppm of an anti-foam agent, the anti-foam agent comprising the following components on a w/w basis:
silica between about 1% to about 10%;
vegetable oil between about 20% to about 80%; and
polyglycol mix between about 10% to about 70%;
wherein the polyglycol mix includes at least one polypropylene glycol having a molecular weight of 2000 and at least one polyethylene glycol having a molecular weight of 600 or less.

13. A method of controlling, in a milk or milk-based carbonated beverage, the retention of $CO_2$ once exposed to atmospheric pressure, the method comprising:

adding between about 10 ppm and about 50 ppm of an anti-foam agent to the milk or milk-based beverage, the anti-foam agent including the following components on a w/w basis:

silica between about 1% to about 10%;

vegetable oil between about 20% to about 80%; and polyglycol mix between about 10% to about 70%;

wherein the polyglycol mix includes at least one polypropylene glycol having a molecular weight of 2000 and at least one polyethylene glycol having a molecular weight of 600 or less.

14. A milk powder, the milk powder containing between about 10 ppm and about 50 ppm of an anti-foam agent, the anti-foam agent comprising the following components on a w/w basis:

silica between about 1% to about 10%;

vegetable oil between about 20% to about 80%; and polyglycol mix between about 10% to about 70%;

wherein the polyglycol mix includes at least one polypropylene glycol having a molecular weight of 2000 and at least one polyethylene glycol having a molecular weight of 600 or less.

* * * * *